Aug. 18, 1959    J. W. E. HANES    2,900,028
WELL PIPE AND FLEXIBLE JOINTS THEREFOR
Filed Dec. 13, 1955    4 Sheets-Sheet 1

INVENTOR.
JAMES W. E. HANES
BY
Bernard Kriegel
ATTORNEY.

Aug. 18, 1959 J. W. E. HANES 2,900,028
WELL PIPE AND FLEXIBLE JOINTS THEREFOR
Filed Dec. 13, 1955 4 Sheets-Sheet 3

INVENTOR.
JAMES W. E. HANES
BY Bernard Kriegel
ATTORNEY.

Aug. 18, 1959     J. W. E. HANES     2,900,028
WELL PIPE AND FLEXIBLE JOINTS THEREFOR
Filed Dec. 13, 1955     4 Sheets-Sheet 4

INVENTOR.
JAMES W. E. HANES
BY
*Bernard Kriegel*
ATTORNEY.

United States Patent Office 2,900,028
Patented Aug. 18, 1959

2,900,028

WELL PIPE AND FLEXIBLE JOINTS THEREFOR

James W. E. Hanes, Ventura, Calif., assignor to Huntsinger Associates, a joint venture consisting of Fritz Huntsinger, Mathilde Huntsinger, Carl F. Huntsinger, Fritz R. Huntsinger, James W. E. Hanes, and Joel L. Glenn Application December 13 1955, Serial No. 552,913

21 Claims. (Cl. 166—242)

The present invention relates to subsurface well equipment, and more particularly to production liners and similar pipe adapted to be disposed in well bores.

Production liners or pipes installed in a well bore have rigid joints connecting the liner sections together. The joints may include intervening coupling members threadedly and rigidly attached to the liner or pipe sections, or threaded portions integral with the pipe or liner sections themselves that are threadedly and rigidly secured together. Regardless of the specific mode of securing the liner sections to one another, the joints are rigid, allowing no relative movement between adjacent liner sections to occur.

As oil, gas, water, or other fluids are removed from the producing zone or stratum, subsidence of the partially or fully depleted formation may occur, the producing zone foreshortening and imposing compression or bending loads on the rigidly connected production liner or pipe in the well bore. When the loads due to subsidence of the formation become great enough, they cause failure of the liner or pipe, usually at one or more of the joints, since the joint strength is ordinarily only from about sixty percent to about eighty percent of the strength of a liner or pipe section.

An object of the present invention is to provide a liner or pipe construction capable of automatically adjusting itself to compensate for excessive loads that would otherwise be imposed on the construction due to formation subsidence, thereby minimizing the opportunity for failure of the liner or pipe, particularly at its coupling joints.

Another object of the invention is to provide a liner or pipe construction which is automatically adjustable in length by a subsiding formation when a predetermined load is imposed on the liner or pipe construction by such formation. Preferably, the predetermined load is no more than the yield point of a liner or pipe section.

A further object of the invention is to provide a liner or pipe construction which can be automatically shortened by a subsiding formation when placing an excessive compressive load on the construction, and which can be automatically lengthened by the subsiding formation in the event it imposes an excessive bending or tensile load on the construction.

Yet another object of the invention is to provide a production liner or pipe joint comprising companion male and female elements capable of shifting longitudinally with respect to each other when a predetermined load is placed thereon, such load preferably being less than the yield point of the liner or pipe sections which the point secures together.

This invention possesses many other advantages, and has other objects which may be made more clearly apparent from a consideration of several forms in which it may be embodied. Such forms are shown in the drawings accompanying and forming part of the present specification. These forms will now be described in detail, for the purpose of illustrating the general principles of the invention; but it is to be understood that such detailed description is not to be taken in a limiting sense, since the scope of the invention is best defined by the appended claims.

Referring to the drawings.

Figures 1, 2, 3, 4, 5, 6:
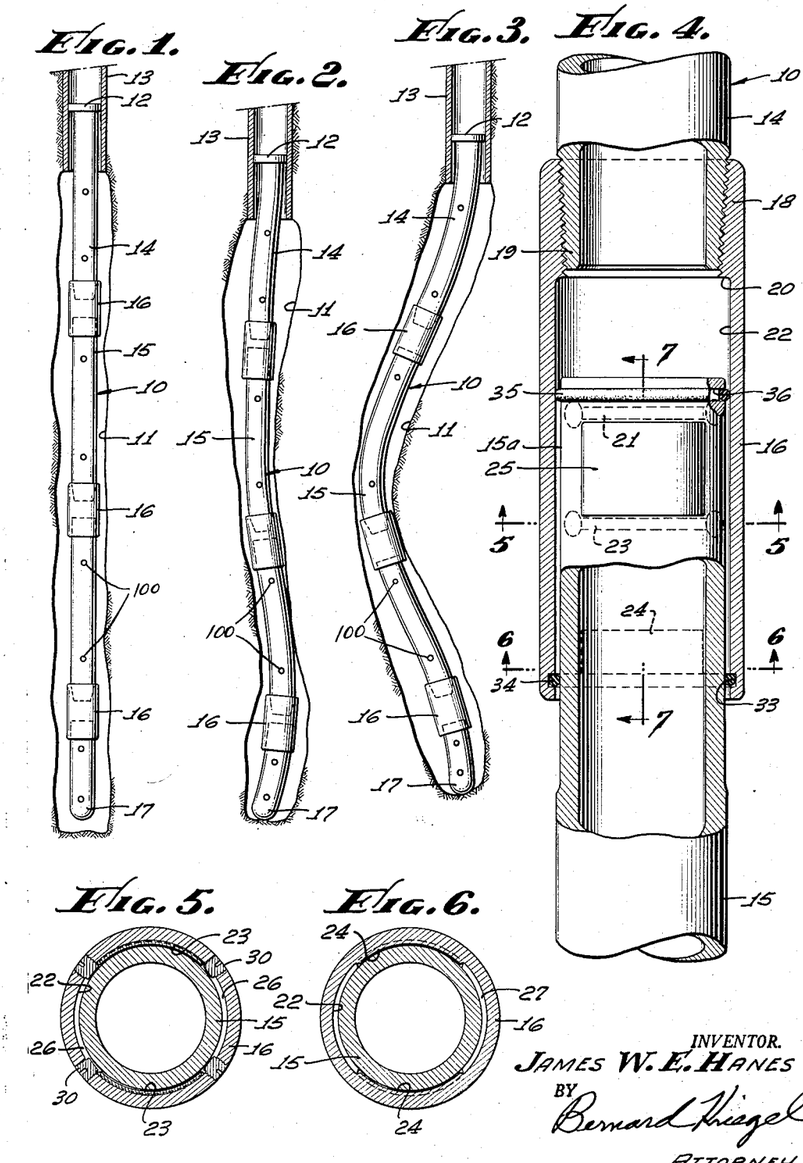
Figure 1 is a diagrammatic view through a newly completed well bore, disclosing a production liner in the well bore and in its original position therein.
Fig. 2 is a view similar to Fig. 1, disclosing a possible condition of the well liner after one type of subsidence of the producing formation.
Fig. 3 is a view similar to Fig. 1, disclosing the condition of the liner as a result of another type of subsidence of the producing formation.
Fig. 4 is a longitudinal section, with parts shown in elevation, through one of the joints that can be used for connecting liner sections together.
Fig. 5 is a cross-section taken along the line 5—5 on Fig. 4.
Fig. 6 is a cross-section taken along the line 6—6 on Fig. 4.

As disclosed in Figs. 1, 2 and 3, a liner 10, or a string of pipe, is disposed in the producing region or zone 11 of a well bore, this liner being suitably supported, by means of a liner hanger 12, or the like, from the lower portion of a string of well casing 13, which may extend to the top of the hole. The liner 10, or pipe string, is normally made of a plurality of sections 14, 15 that are interconnected by suitable couplings 16.

Initially, the production liner or pipe 10 is installed in the well, being supported from the casing 13 by the liner hanger 12, with its lower end 17 several feet off the bottom of the hole. Originally, the producing zone 11 may have a certain thickness or depth and the liner 10 will hang straight in the well. The production will flow from the zone 11 to the well bore, and will pass into the liner through slots or holes 100 formed therein, in order to exclude the majority of the sand or rock particles in the production fluid from passing into the interior of the liner string 10. Thus, following the setting of the liner in a newly completed well, it will remain in the position illustrated in Fig. 1, with only normal loads imposed on the liner joints, which are far less than the loads at which failure at a joint may occur, or possibly failure of a liner section itself. Ordinarily, the joints are the weakest points in a liner string, inasmuch as their strength is substantially less than that of the liner sections themselves.

After the producing formation 11 has been partially depleted, a certain amount of subsidence or foreshortening of the zones can occur, such as illustrated in Fig. 2. This foreshortening or shrinkage of the producing zone may cause the lower end 17 of the liner string 10 to rest on bottom, and will produce an excessive compressive load thereon. If this compressive load exceeds the strength of the joints or couplings 16, a failure could occur at such point or points. This is particularly true if it is assumed that the liner sections 14, 15 are rigidly secured to each other, as by means of the usual types of threaded couplings, or the usual types of direct threaded connections between the liner sections themselves. There is no provision in the liner string for change or shortening in its length, there being an eventual subjecting of the liner string to excessive compressive loads of an order to cause a failure at the joints 16.

The subsidence of the producing zone 11 after partial depletion of the gas, oil, water, or other fluids in the well bore, may be accompanied by a heaving, or lateral movement, of the producing formation of the type disclosed in Fig. 3. Such movement of the producing zone not only causes its foreshortening, but also effects a bending action on the liner string 10, placing it in tension. Inasmuch as the liner is not free to move longitudinally in the well bore, if an excessive tensile load is imposed thereon, a failure could occur at one or more of the joints 16 of the liner or pipe string. Rigid attachment of couplings 16 to the liner sections 14, 15, or rigid attachment of the liner sections directly to each other, would preclude relative longitudinal movement between the sections, which could prevent the failure of the type indicated.

The present invention overcomes the aforenoted defects of rigidly interconnected liner sections 14, 15 by securing these sections to one another in such manner that abnormal compressive or tensile loads imposed thereon will permit the sections to move longitudinally with respect to each other. Under normal load conditions, the liner sections 14, 15 are securely coupled to each other against relative movement, relative movement between the sections being permitted only upon the liner 10 being subjected to predetermined excessive loads. Preferably, the maximum loads to produce relative movement by the subsiding formation upon the liner sections will be equal to the yield point of a liner section 14 or 15.

In the form of invention disclosed in Figs. 4 to 10, inclusive, adjacent liner sections 14, 15 are connected to each other by a coupling 16 that will attach the sections against relative movement under normal loads imposed thereon, but in which the connection will shear to permit relative longitudinal movement between the sections 14, 15 when abnormal loads are imposed thereon. As specifically disclosed, the joint between adjacent sections includes a tubular coupling 16 having an upper threaded box 18 threadedly receiving the lower pin end 19 of an upper liner section 14. Adjacent the lower end of the threaded box is a stop or limit shoulder 20 designed to limit upward relative movement of an adjoining lower liner section 15 which is telescopically arranged within the coupling 16, extending upwardly thereinto from its lower end.

The coupling 16 has a pair of diametrically opposed upper shear ring segments 21 integral therewith and extending inwardly of the inner wall 22 of the coupling to a small extent, which may be equivalent to the depth of a thread in the threaded box 18, although such depth can be varied and is not critical. These upper segments 21 extend only part way around the inner wall of the coupling. As specifically disclosed, they may extend slightly less than 90 degrees around the coupling wall 22. Disposed below and spaced from the upper ring segments 21 are a pair of diametrically opposed lower ring segments 23 integral with the coupling 16 that are in longitudinal alignment with the upper ring segments 21 and of the same arcuate extent. Disposed below the lower ring segments 23 and spaced therefrom are a pair of diametrically opposed stop or limit ring segments 24 in alignment with the other segments 21, 23 and possessing substantially the same arcuate extent. These stop ring segments 24 are integral with the coupling 16 and are of a much greater length than the upper and lower shear ring segments 21, 23. As a matter of fact, each set of shear ring segments 21, 23 is of a relatively small longitudinal extent, so as to shear from the wall of the coupling when subjected to a certain predetermined maximum load. For example, the maximum load may be the yield point of a liner section 14, 15, which would still be substantially less than the ultimate strength of the threaded joint between the pin 19 and box 18.

At the upper end of the lower liner section 15, a pair of diametrically opposed coupling ring segments 25 are provided which are integral with the liner section 15 and extend outwardly from its periphery. These coupling ring segments have substantially the same arcuate extent as the shear ring segments 21, 23 and stop ring segments 24, but are relatively long longitudinally of the apparatus, so as to have a much greater shear strength than that of the upper and lower sets of shear rings 21, 23. The outside diameter of the upper portion 15a of the liner section is slightly less than the inside diameter across the upper shear ring segments 21, lower shear ring segments 23 and lower stop ring segments 24, to permit the lower liner section 15 to telescope within the coupling 16 itself. Similarly, the outside diameter across the coupling ring segments 25 is substantially equal to the inside diameter of the coupling wall 22, to permit the lower liner section 15 to move longitudinally within the coupling 16.

Figures 7, 8, 9, 10, 11:
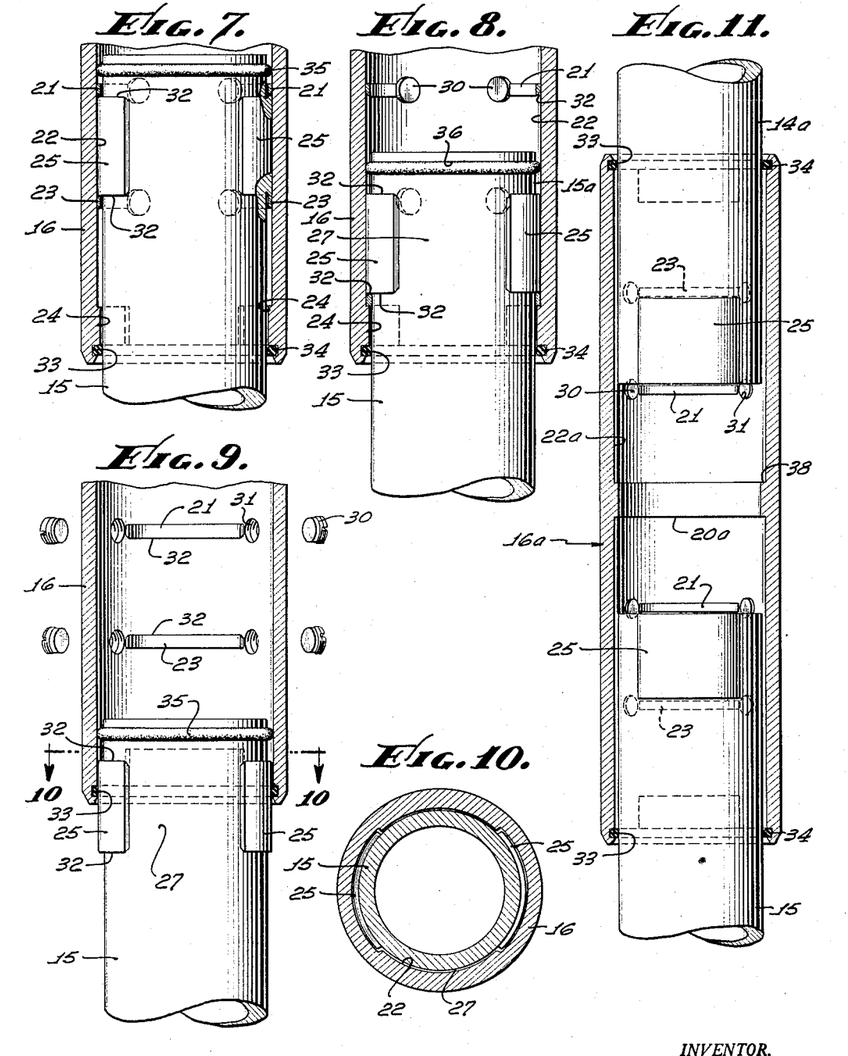
Fig. 7 is a longitudinal section taken along the line 7—7 on Fig. 4.
Fig. 8 is a view similar to Fig. 7, with the parts of the joint in another relative position.
Fig. 9 is a view similar to Fig. 7, disclosing the mode of assembling the liner joint.
Fig. 10 is a cross-section taken along the line 10—10 on Fig. 9.
Fig. 11 is a longitudinal section, with parts shown in elevation, through another embodiment of the invention.
Figure 12:
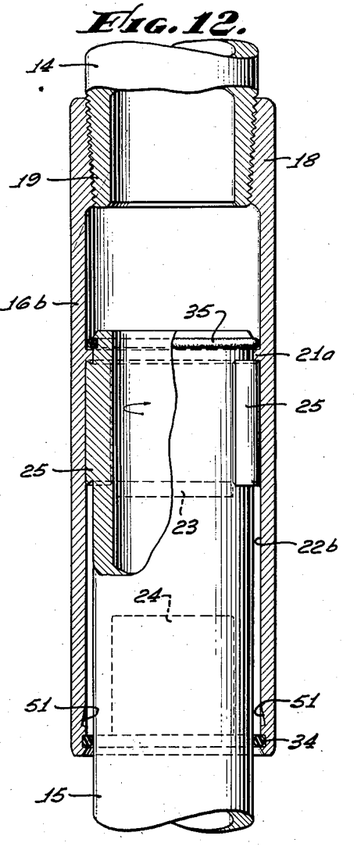
Fig. 12 is a combined longitudinal section and side elevational view through another embodiment of the invention, with the parts in process of being assembled to one another.
Figure 13:
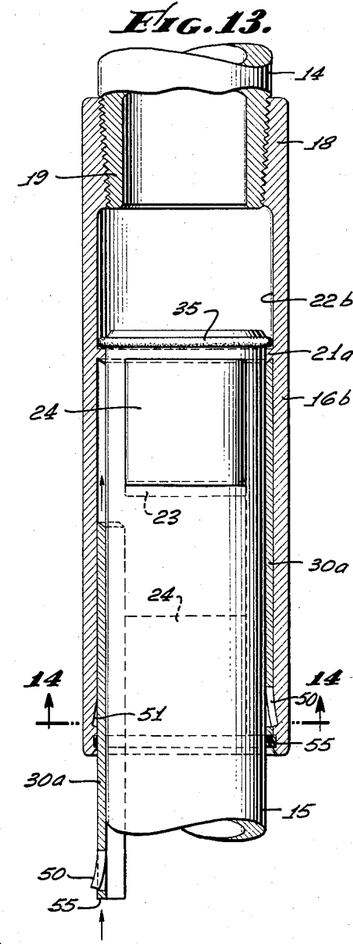
Fig. 13 is a view similar to Fig. 12, disclosing a further arrangement of the parts just prior to their complete assembly.
Figure 14:
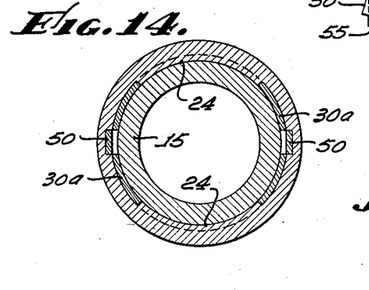
Fig. 14 is a cross-section taken along the line 14—14 on Fig. 13.

It is to be noted that the arcuate spaces 26 between the shear ring segments 21 and 23 and the stop ring segments 24 are slightly greater in extent than the arcuate extent of the coupling ring segments 25, and that the arcuate spaces 27 between the coupling ring segments 25 are slightly greater in circumferential extent than the shear ring segments and stop ring segments. Accordingly, the lower liner section 15 may be turned so as to place its coupling ring segment 25 in alignment with the arcuate spaces 26 between the shearing and stop ring segments 21, 23, 24, and the latter in alignment with the arcuate spaces 27 between the coupling ring segments. When in such alignment, the lower liner section 15 can be moved upwardly into the coupling 16 until coupling ring segments 25 are disposed between the lateral planes of the upper and lower shear ring segments 21, 23. Each coupling ring segment 25 has a longitudinal extent that is slightly less than the distance between the upper shear ring segments 21 and the lower shear ring segments 23, in order that the insertion of the lower liner section 15 into the coupling 16, with the coupling ring segments 25 disposed opposite the longitudinal space between the upper and lower segments, will permit the lower liner section 15 to be turned approximately 90 degrees, so as to shift the coupling ring segments 25 into position between the upper and lower shear ring segments 21, 23. With the coupling ring segments now disposed in longitudinal alignment with the upper and lower shear ring segments, relative rotation between the parts may be precluded by threading screws 30, or the like, in to companion holes 31 in the coupling on opposite sides of each shear ring segment 21, 23, these screws being engageable with the side edges of the coupling ring segments 25. The coupling ring segments are then in position in which their lower ends are engageable with the upper ends of the lower shear ring segments 23, and their upper ends are engageable with the lower ends of the upper shear ring segments 21.

By virtue of the arrangement described, which is shown in fully assembled position in Figs. 4 and 7, the lower liner section 15 is securely attached to the coupling 16, and in view of the threaded attachment of the coupling 16 to the upper liner section 14, the lower liner section is securely attached to the upper liner section. Accordingly, the upper and lower liner sections 14, 15 can be moved as a unit in the well bore.

When the liner string 10 is assembled with the joints described being used, the longitudinal loads between a lower liner section 15 and a coupling 16 will be transmitted between the coupling ring segments 25 and either the upper shear ring segments 21 or the lower shear ring segments 23, depending upon the direction of the load. To insure that the forces transmitted between the coupling ring segments and the shear ring segments will not tend to expand the couplings 16 or collapse the liner section 15 itself, the contacting faces 32 between the upper and lower ends of the coupling ring segments 25 and the shear ring segments 21, 23 may be slightly undercut. Such undercutting avoids the presence of any components of forces either tending to expand the coupling 16 or to collapse the liner section 15. This is due to the fact that the undercutting will actually cause the load to tend to pull the shear rings 21, 23 inwardly and the coupling ring segments 25 outwardly.

In the use of the apparatus specifically disclosed, a liner or pipe string 10 is run in the well casing 13, the string being of a length that corresponds to the thickness of the producing zone, which, for example, may be from 100 to 2,000 feet. The liner sections 14, 15 are secured to one another by means of the shearable interconnecting joints specifically described, which firmly secure the sections to one another against relative longitudinal movement. The liner string 10 is lowered through the well casing to the desired position in the well bore therebelow, being supported from the lower portion of the well casing 13 by a suitable liner hanger 12, with the lower end 17 of the liner string spaced from the bottom of the hole. Each of the coupling joints will be related in the manner disclosed in Figs. 4 and 7, with the coupling ring segments 25 disposed between the upper and lower sets of shear ring segments 21, 23, the screws 30, or the like, preventing relative rotation between the coupling 16 and the liner section 15 telescoped therewithin.

In a newly completed well, the normal load on the joints will be that due to the weight of the liner below each joint, the producing zone 11 having its initial thickness and position. The production from the zone will pass into the well bore and into the perforations in the liner 10, continuing on up through the liner and the well casing 13 to the top of the hole.

Should the producing zone 11 subside after the well has been in production for a certain period, as a result of partial depletion of the gas, oil, water, or other fluid in the producing zone, it might tend to shift the liner 10 downwardly and impose a compressive load thereon, such as disclosed in Fig. 2. Such compressive loads would be transmitted through the upper shear ring segments 21 to the coupling ring segments 25 on each liner section 15. Since the shear strength of the shear ring segments 21 is preferably no greater than the yield point of a liner section, the compressive load on the liner section would be resisted until it reached a maximum value at which the upper shear rings 21 would shear or be disrupted completely from the inner wall 22 of the coupling 16. When such disrupting occurs, the liner section 15 will telescope relatively in an upward direction in the coupling 16, such relative movement relieving the compressive load, if not completely eliminating it. The amount of telescopic movement of the liner section 15 relatively upwardly within the coupling 16 is limited by engagement of the upper end of the liner section 15 with the limit shoulder 20.

It is, accordingly, evident that the joint provides for flexibility in the liner string 10 by permitting relative telescopic movement when the yield point of the liner string is reached, the compressive load imposed by the producing zone and formation shearing one or more sets of upper shearing segments 21 and allowing the liner section or sections to move relatively with respect to each other and thereby considerably diminish, or completely relieve the compressive load. This, of course, prevents a failure of the liner section from occurring.

If it is assumed that partial depletion of the fluid in the producing zone causes a subsidence or movement of the formation in a lateral direction, such as illustrated in Fig. 3, or in the event that there is lateral formation movement in the region of the liner string from some other cause, such movement may tend to deflect or bend the entire liner string 10, placing the liner sections and the joints interconnecting them in tension. The couplings will originally occupy the positions disclosed in Figs. 4 and 7, which is their normal relative positions. Such tensile load is then being transmitted from each liner section 15 through its coupling ring segments 25 to the lower shear ring segments 23 of the coupling 16. Should the tensile load exceed the shear strength of the lower shear ring segments 23, which is preferably no greater than the yield point of a liner section, then such lower shear ring segments will be sheared or disrupted from the coupling 16, allowing relative downward telescopic movement of the liner section 15 with respect to the coupling 16. Such downward movement can occur to the extent limited by engagement of the shear segments 23 with the lower stop or limit ring segments 24 on the coupling, in the manner illustrated in Fig. 8. The ability of the liner sections 15 to move in a separating direction with respect to each other will relieve the tension in the liner string 10 and prevent its failure, particularly at one or more of the coupling joints of the liner string.

Accordingly, it is evident that by use of the shearable joints or couplings between the liner sections 14, 15, applicant has provided for automatic compensating in the length of the liner, in the event that abnormal loads are imposed thereon. Abnormal compressive loads will result in shortening of the liner spring 10 because of the relative upward telescoping of the upper ends of the liner sections 15 within the couplings 16, whereas abnormal tensile loads imposed on the liner will effect an automatic elongation of the liner 10, by virtue of the ability of the liner sections 15 to move downwardly within their associated couplings. Failure of the joints is thereby prevented, inasmuch as excessive loads cannot be imposed upon them.

For the purpose of preventing solids, such as sand and the like, from packing between the lower liner section 15 and the coupling 16, which could possibly interfere with the relative telescopic action between these two parts, suitable sealing devices are provided therebetween. The coupling 16 extends downwardly below the lower stop or limit ring segments 24, and has a circumferentially continuous groove 33 therein, in which a rubber or rubber-like seal ring 34, such as an O ring, can be inserted. This seal ring bridges the substantial clearance space between the wall 22 of the coupling and the periphery of the lower liner portion 15a, and firmly and slidably seals against the latter, thereby preventing solid particles, and the like, from passing upwardly between the lower liner section and the coupling.

A rubber or rubber-like seal ring 35, such as an O ring, may also be provided in a peripheral groove 36 formed in an upper extension of the lower liner section 15 substantially above the coupling ring segments 25. The grooved portion of the liner section will be disposed above the upper shear ring segments 21 when the coupling ring segments 25 are located between and in alignment with the upper and lower shear segments 21, 23, after which the seal ring 35 is disposed in the groove 36 and bridges the clearance space between the liner section and the coupling, slidably sealing against the wall 22 of the latter, thereby preventing sand or other solid materials from passing downwardly between the liner section 15 and the coupling 16.

By virtue of the upper and lower seal rings 35, 34, the annular space between the liner section 15 and coupling 16 is kept free from solid foreign matter, which might interfere with appropriate telescoping between the lower liner section and coupling, in the event the upper or the lower shear ring segments 21 or 23 are disrupted.

The upper and lower seal rings 35, 34 are inserted in place after the liner section has been assembled to the coupling. Following such assembly, the lower seal ring 34 may be moved upwardly along the liner section 15, through the space between the lower end of the coupling and the liner section, being pressed into the internal groove 33. Similarly, after appropriate assembly between the liner section 15 and coupling 16 has occurred, the upper seal ring 35 may be inserted through the threaded box 18 and forced over the upper end of the liner section and through the annular space between its upper end and the wall of the coupling into the peripheral groove 36.

In lieu of the specific coupling illustrated in Figs. 4 to 10, inclusive, by virtue of which the end of one liner section 14 is threadedly secured to the coupling 16, and the end of the other liner section 15 is secured to the coupling by means of the shearable ring segments, both the upper and lower liner sections 14a, 15 may be secured to a coupling 16a by shearable ring segments, as disclosed in Fig. 11. The lower liner section 15 is attached to the coupling in the same manner as described in connection with the other embodiment of the invention. Similarly, the lower portion of the upper liner section 14a is constructed in the same manner as the upper portion of the lower liner section 15, being telescoped within the upper portion of the coupling sleeve 16a, which is constructed the same as its lower portion. Thus, the coupling sleeve will have a limit shoulder 38 to be engaged by the lower end of the upper liner section 14, and it will also have upper and lower sets of shearable ring segments 23, 21 integral with its wall 22a. These segments will have a shear strength no greater than the yield point of the liner section 14a, and will possess the same arcuate extent as the lower sets of segments 21, 23, the upper set 23 being spaced from the lower set to enable the coupling segments 25 on the upper liner section 14a to be disposed therebetween, the upper screws or pins 30 being threaded in the upper holes 31 to prevent removal of the coupling segments 25 from their aligned position between the upper and lower segments 23, 21. Similarly, the upper end of the coupling sleeve 16a will have stop or limit ring segments 24 in alignment with the shearable ring segments 23, 21.

If slip joints for the adjacent end portions of the upper and lower liner sections 14a, 15 are used, as disclosed in Fig. 11, the subjecting of the liner sections and intervening couplings to excessive compressive loads can result in shearing of the upper ring segments 21 in the lower portion of the coupling 16a and of the lower ring segments 21 in the upper portion of the coupling, allowing the liner string to shorten. The extent of inward telescoping movement of the upper and lower liner sections 14a, 15 with respect to the coupling 16a is limited by engagement of the upper ends of the ring segments 21 with the downwardly directed coupling shoulder 20a, and by engagement of the lower end of the upper liner section 14a with the upwardly facing coupling shoulder 38.

In the event excessive tensile forces are imposed on the liner sections and the intervening couplings, then a shearing of the lower ring segments 23 in the lower portion of the coupling 16a and of the upper ring segments 23 in the upper portion of the coupling can occur, allowing the upper and lower sections 14a, 15 to move in longitudinal directions outwardly of the coupling to the extent limited by engagement of the lower shear segments 23 with the lower limit ring segments 24 and of the upper shear segments 23 with the upper limit segments 24 in the upper end of the coupling.

With the double shearable joints disclosed in Fig. 11, twice the range of relative longitudinal movement between adjoining coupling sections can occur. As a matter of fact, only one set of segments, such as an upper set 21 or 23, may shear at a particular time, and it would then take further subsidence of the formation to again impose excessive compressive or tensile loads on the liner string to cause a particular set of ring segments in the other portion of the coupling to shear (such as in the lower portion), to allow further relative movement between the liner sections 14a, 15 and the coupling 16a, which will prevent failure at a joint or at a plurality of joints.

In the form of invention disclosed in Fig. 11, sand and similar solid materials are prevented from entering the spaces between the upper liner section 14a and the coupling 16a and between the lower liner section 15 and the coupling 16a by providing a sealing device at each end of the coupling. Thus, the lower end of the coupling sleeve may extend downwardly below the stop ring segments 24 to a relatively small extent, this portion having the internal groove 33 adapted to receive the rubber or rubber-like seal ring 33. This seal ring will bridge the annular space between the lower liner section 15 and the coupling 16a, in order to engage the lower liner section, and will, therefore, be incapable of withstanding substantial pressures. However, such pressures are not encountered in the use of the liner arrangement, the seal ring still being effective to prevent sand and similar solid particles from passing upwardly between the lower liner section 15 and the coupling 16a.

A similar seal arrangement may be provided between the upper liner section 14a and the coupling sleeve 16a. The coupling extends upwardly above the upper stop ring segments 24 and has a circumferentially continuous internal groove 33 to receive a rubber or rubber-like seal ring 34, such as an O ring, which bears against the periphery of the upper liner section 14a.

Both the upper and lower seal rings 34 may be disposed in their grooves after the particular liner section against which they bear has been inserted in appropriately assembled position within the coupling sleeve 16a. Each seal ring 34 can be forced through the clearance space between a liner section and the coupling and into the groove 33 in which it is to be contained.

In the form of invention disclosed in Figs. 15 to 20, inclusive, the apparatus is generally the same as disclosed in Fig. 4. Thus, the upper liner section 14 is threadedly secured to a tubular coupling 16b, there being a lower liner section 15 piloted or telescoped upwardly within this coupling. The lower liner section 15 has a diametrically opposed pair of coupling ring segments 25 of extended length at its upper portion which are adapted to be placed between an upper circumferentially continuous shear ring 21a integral with the coupling wall 22b and extending inwardly therefrom, and a pair of diametrically opposite lower shear ring segments 23, which have the same arcuate extent as the shear ring segments of the other forms of the invention, and which also have the arcuate spaces 26 therebetween through which the coupling ring segments can pass when the lower liner section 15 is being assembled in the coupling. Moreover, as in the other form of the invention, the coupling 16b has the stop or limit ring segments 24 of substantial length integral therewith, spaced arcuately from each other by a sufficient distance to permit the coupling ring segments 25 to move therebetween when the apparatus is being assembled. The lower shear ring segments 23 and the stop ring segments 24 are, of course, in longitudinal alignment with each other and possess the same arcuate extent, the coupling ring segments 25 on the liner section 15 also having the same arcuate extent as the parts just described.

The lower liner section 15 is inserted into the coupling 16b in an upward direction in the same manner as the apparatus disclosed in Fig. 4, the coupling ring segments 25 moving through the arcuate spaces 26 between the stop ring segments 24 and the lower shear ring segments 23, until such coupling segments engage the underside of the continuous shear ring 21a. When such engagement occurs, the liner section 15 can be rotated approximately 90 degrees to place the coupling ring segments 25 between the upper shear ring 21a and the lower shear ring segments 23 and in full alignment with the latter. The lower liner section 15 is then maintained in such aligned position by a pair of arcuate lock bars or retainer segments 30a which are each of an arcuate extent corresponding to the arcuate spaces 26 between the stop ring segments 24, which is the same extent as exists between the lower shear ring segments 23. Each lock bar 30a also has a length which is substantially equal to the distance from the lower end of the upper continuous shear ring 21a to the lower ends of the stop ring segments 24. In addition, each stop ring segment 30a has a thickness which is substantially equal to the radial distance between the periphery of the lower liner section 15 and the wall 22b of the tubular coupling 16b.

Figures 15, 16, 17, 18:
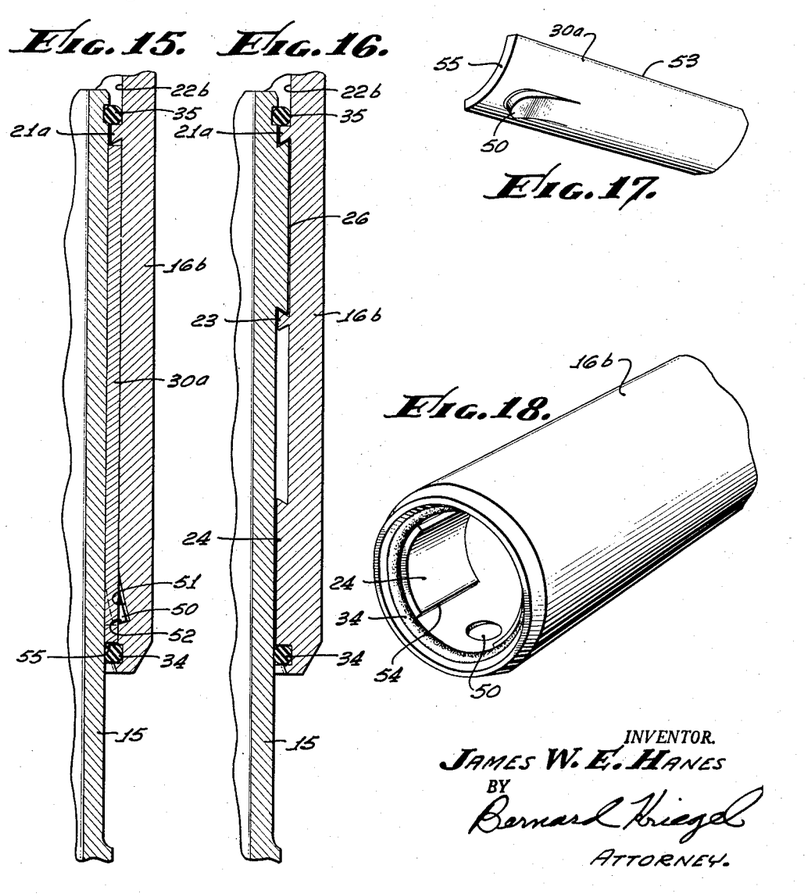
Fig. 15 is an enlarged fragmentary longitudinal section through a portion of the apparatus disclosed in Fig. 13, with the parts fully assembled and in position.
Fig. 16 is a view similar to Fig. 15, taken on the apparatus at substantially 90 degrees therefrom.
Fig. 17 is an isometric projection of one of the locking or retaining bars for holding the apparatus in assembled relation.
Fig. 18 is an isometric projection looking upwardly from the lower end of the outer coupling sleeve itself, and with the lower liner section removed therefrom.
Figure 19:
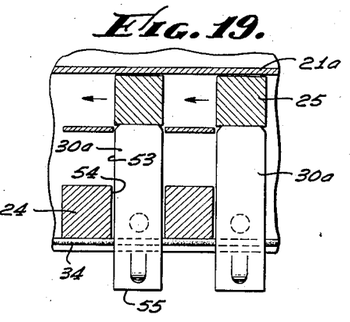
Fig. 19 is a diagrammatic view illustrating a mode of assembling the apparatus disclosed in Figs. 12 to 18, inclusive.
Figure 20:
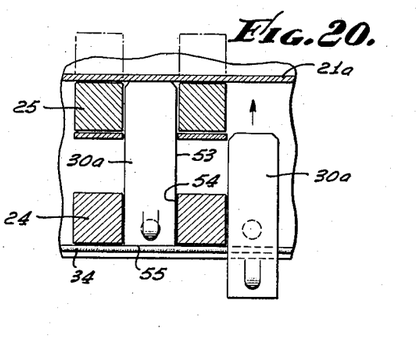
Fig. 20 is a view similar to Fig. 19, disclosing a further step in the assembly of the apparatus.

With the coupling ring segments 25 in alignment with the lower shear ring segments 23, the segmental lock bars 30a are inserted upwardly through the arcuate spaces 26 between the stop ring segments 24 and also through the spaces 27 between the coupling ring segments until the upper end of the lock bar engages the continuous shear ring 21a. When such engagement occurs, a spring-like holding finger or lug 50 struck outwardly from the lock bar will spring into a depression or recess 51 drilled into the wall 22b of the coupling 16b, with the lower end 52 of such recess being disposed transversely, in order to engage the end of the holding lug 50 and prevent withdrawal of the lock bar 30a from the coupling. The spring finger 50 can spring inwardly to permit upward passage of the lock bar 30a to its fullest extent until it contacts the continuous shear ring 21a, the finger then inherently springing outwardly into the holding depression or recess 51 in the coupling 16b.

The other lock bar of the pair is then inserted upwardly between the liner section and the tubular coupling 16b through the other aligned arcuate spaces 26, 27 in the inner and outer members 15, 16b, and this lock bar will likewise engage the upper continuous shear ring 21a, its spring finger 50 inherently shifting outwardly into the depression or recess 51 to prevent return movement or withdrawal of the lock bar from the coupling.

With the parts in the position so far described, the side edges 53 of each lock bar engage the longitudinal edges 54 of the stop ring segments 24, which prevent arcuate shifting of the lock bars 30a within the tubular coupling. Such shifting will also be resisted by the spring fingers 50. The upper portions of the lock bars also cover substantially completely the arcuate spaces 27 between the coupling ring segments 25, preventing such segments from turning. Rotation of the lower liner section 15 with respect to the coupling is further resisted by the engagement of the upper portion of the lock bars with the side or end edges of the lower shearing segments 23.

The seal ring arrangement in the form of invention shown in Figs. 12 to 20, inclusive, is essentially the same as disclosed in Fig. 4. Following assembly of the lower liner section 15 in the tubular coupling 16b, with the lock bars 30a inserted in place, the lower seal ring 34 can be moved upwardly along the liner section 15 and can be forced within the internal groove 33 in the lower portion of the tubular coupling 16b, the seal ring engaging the periphery of the lower linear section. It is to be noted that the lower end 55 of each lock bar lies in substantially the same plane as the lower end of the stop ring segments 24, the stop ring segments and lock bars forming a substantially circumferentially continuous shoulder against which the seal ring 34 can bear. Accordingly, the seal ring 34 is not only capable of preventing upward passage of solid particles between the lower liner section 15 and the coupling 16b, but the fact that the seal ring is backed up by the stop ring segments 24 and the lock bar segments 30a around its entire circumference enables it to withstand substantial pressures tending to urge the seal ring in an upward direction in the drawings.

The upper seal ring arrangement is essentially the same as disclosed in Fig. 4. However, as in the form of invention shown in Figs. 12 to 20, inclusive, the upper seal ring 35 can engage the upper surface of the continuous shear ring 21a in addition to the wall 22b of the tubular coupling. The fact that such shear ring 21a is continuous affords a proper backing for the seal ring to cause it to resist substantial fluid pressures acting in a downward direction thereon.

With the parts fully assembled, relative rotation between the liner section 15 and the coupling 16b cannot occur, by virtue of the locking action of the elongate bars or retainer segments 30a. If the joint is subjected to tension in excess of the shear strength of the lower shear ring segments 23, then such segments will be disrupted, allowing relative downward movement of the lower liner section 15 with respect to the coupling 16b, until the sheared segments 23 engage the lower limit ring segments 24 of the coupling. During such downward movement, the coupling ring segments 25, as well as the sheared lower ring segmental portions 23, slide in straight line paths down along the wall of the tubular coupling 16b, being guided by the side edges 53 of the lock bars 30a. Even when engaged with the lower stop ring segments, the coupling ring segments 25 still engage the side edges of the lock bars, to prevent relative rotation between the liner section 15 and the coupling 16b.

Instead of the lower shear ring segments 23 being disrupted in the manner just described, if the joint is subjected to an abnormal compressive load sufficient to shear out segmental portions of the upper continuous shear ring 21a, the coupling ring segments 25 on the liner will disrupt diametrically opposed segments of the continuous shear ring 21a from the wall of the tubular coupling, as well as from the adjacent portions of the continuous shear ring in alignment with the lock bars 30a, the liner section 15 moving relatively upward within the tubular coupling to the extent determined by engagement of the upper end of the liner with the lower end of the upper liner section 14. When such engagement occurs, the lower portions of the coupling ring segments 25 will still be disposed between the remaining segmental parts of the continuous shear ring 21a adhering to the tubular coupling 16b, which will couple the liner section 15 to the tubular coupling 16b against relative rotation therebetween, insuring a proper telescopic movement between the liner section and the coupling after the aforenoted shearing action of the segmental portions of the upper continuous shear ring has occurred. In other words, the liner section 15 would then be free to move downwardly with respect to the tubular coupling 16b, inasmuch as the coupling ring segments 25 cannot turn and be disposed above the remaining parts of the continuous shear ring 21a, which would engage the upper ends of the shear ring portions remaining integral with the coupling wall 22b.

As in connection with the other forms of the invention, the upper and lower shear ring members 21, 23 may be proportioned to shear when a load substantially equal to the yield point of a liner section is reached, which is far below the ultimate strength of this liner section. Accordingly, assurance is had against failure of the liner 10 as a result of being subjected to abnormal compressive loads, as well as abnormal tensile or bending loads.

The inventor claims:

1. In a tubular string adapted to be disposed in a well bore: an outer tubular member; an inner tubular member telescoped within said outer member; means for preventing substantial longitudinal movement in both directions between said members, including a transversely extending portion integral with one of said members and being of extended length circumferentially around said one member, said portion being shearable from said one member; means on said other member engaging said portion to transmit longitudinal loads therebetween; the force required to shear said portion from said one member being a predetermined value substantially less than the ultimate strength of both of said members.

2. In a tubular string adapted to be disposed in a well bore: an outer tubular member; an inner tubular member telescoped within said outer member; means for preventing substantial longitudinal movement in both directions between said members, including a transversely extending portion integral with one of said members and being of extended length circumferentially around said one member, said portion being shearable from said one member; means on said other member engaging said portion to transmit longitudinal loads therebetween; the force required to shear said portion from said one member being substantially less than the ultimate strength of both of said members and substantially equal to the yield point of one of said members.

3. In a tubular string adapted to be disposed in a well bore: an outer tubular member; an inner tubular member telescoped within said outer member; means for preventing substantial longitudinal movement in both directions between said members, including upper and lower longitudinally spaced transversely extending portions integral with one of said members and being of extended length circumferentially around said one member, said portions being shearable from said one member; said other member having a transversely extending portion disposed between and engaging said upper and lower portions to transmit loads therebetween in both upward and downward directions; the force required to shear each of said upper and lower portions of said one member being predetermined and substantially less than the ultimate strength of both of said members.

4. In a tubular string adapted to be disposed in a well bore; an outer tubular member; an inner tubular member telescoped within said outer member; one of said members being weaker than the other of said members; means for preventing substantial longitudinal movement in both directions between said members, including upper and lower longitudinally spaced transversely extending portions integral with one of said members and being of extended length circumferentially around said one member, said portions being shearable from said one member; said other member having a transversely extending portion disposed between and engaging said upper and lower portions to transmit loads therebetween in both upward and downward directions; the force required to shear each of said upper and lower portions from said one member being substantially less than the ultimate strength of both of said members and substantially equal to the yield point of the weaker of said members.

5. In a tubular string adapted to be disposed in a well bore: an outer tubular member; an inner tubular member telescoped within said outer member; one of said members having a transversely extending portion integral therewith and extending therearound, said portion being shearable from said one member; said other member engaging said portion to transmit longitudinal loads therebetween; the force required to shear said portion from said one member being substantially less than the ultimate strength of both of said members; and coengageable stop means on said members for limiting the extent of telescopic movement between said members upon shearing of said portion from said one member.

6. In a tubular string adapted to be disposed in a well bore: an outer tubular member; an inner tubular member telescoped within said outer member; means for preventing substantial longitudinal movement in both directions between said members, including a plurality of circumferentially spaced transversely extending segmental portions integral with one of said members and being of extended length circumferentially around said one member and shearable therefrom; said other member having companion circumferentially spaced transversely extending segmental portions alignable and engaging said other portion to transmit longitudinal loads therebetween; the force required to shear said shearable portions from said one member being predetermined and substantially less than the ultimate strength of both of said members.

7. In a tubular string adapted to be disposed in a well bore: an outer tubular member; an inner tubular member telescoped within said outer member; one of said members having a plurality of circumferentially spaced transversely extending segmental portions integral therewith and shearable therefrom; said other member having companion circumferentially spaced transversely extending segmental portions alignable and engaging said other portion to transmit longitudinal loads therebetween; the force required to shear said shearable portions from said one member being substantially less than the ultimate strength of both of said members; and coengageable stop means on said members for limiting the extent of telescopic movement between said members upon shearing of said shearable portions from said one member.

8. In a tubular string adapted to be disposed in a well bore: an outer tubular member; an inner tubular member telescoped within said outer member; one of said members having a plurality of circumferentially spaced transversely extending segmental portions integral therewith and shearable therefrom; said one member also having another transversely extending portion integral therewith and shearable therefrom which is longitudinally spaced from said other portions; said other member having circumferentially spaced transversely extending segmental portions disposed between and engaging said longitudinally spaced portions and in longitudinal alignment with said segmental portions to transmit longitudinal loads between said members in both directions; said segmental portions of said other member being closely adjacent said transversely extending segmental portions and another transversely extending portion of said one member to prevent substantial longitudinal movement in both directions between said members; the force required to shear said shearable segmental portions being predetermined and substantially less than the ultimate strength of both of said members; the force required to shear said another transversely extending portion also being predetermined and substantially less than the ultimate strength of both of said members.

9. In a tubular string adapted to be disposed in a well bore: an outer tubular member; an inner tubular member telescoped within said outer member; one of said members having a plurality of circumferentially spaced transversely extending segmental portions integral therewith and shearable therefrom; said one member also having another transversely extending portion integral therewith and shearable therefrom which is longitudinally spaced from said other portions; said other member having circumferentially spaced transversely extending segmental portions disposed between and engaging said longitudinally spaced portions and in longitudinal alignment with said segmental portions to transmit longitudinal loads between said members in both directions; the force required to shear said shearable segmental portions being substantially less than the ultimate strength of both of said members; the force required to shear said another transversely extending portion also being substantially less than the ultimate strength of both of said members; and means for preventing substantial relative rotation between said members to maintain the segmental portions of said other member in alignment with the segmential portions of said one member when the segmental portions of said other member are between said longitudinally spaced shearable portions.

10. In a tubular string adapted to be disposed in a well bore: an outer tubular member; an inner tubular member telescoped within said outer member; one of said members having a plurality of circumferentially spaced transversely extending stop segments integral therewith and a plurality of circumferentially spaced transversely extending segments integral therewith and shearable therefrom, said shearable segments being longitudinally spaced from and in alignment with said stop segments; said other member having coupling segments movable longitudinally through the spaces between said stop segments and shearable segments for disposition on the side of said shearable segments remote from said stop segments and in alignment with said shearable segments to engage said shearable segments; the force required to shear said shearable segments being substantially less than the ultimate strength of both of said members.

11. In a tubular string adapted to be disposed in a well bore: an outer tubular member; an inner tubular member telescoped within said outer member; one of said members having a plurality of circumferentially spaced transversely extending stop segments integral therewith and a plurality of circumferentially spaced transversely extending segments integral therewith and shearable therefrom, said shearable segments being longitudinally spaced from and in alignment with said stop segments; said other member having coupling segments movable longitudinally through the spaces between said stop segments and shearable segments for disposition on the side of said shearable segments remote from said stop segments and in alignment with said shearable segments to engage said shearable segments; the force required to shear said shearable segments being substantially less than the ultimate strength of both of said members; and means for preventing substantial relative rotation between said members to maintain said coupling segments longitudinally aligned with said shearable segments and stop segments.

12. In a tubular string adapted to be disposed in a well bore: an outer tubular member; an inner tubular member telescoped within said outer member; one of said members having a plurality of circumferentially spaced transversely extending stop segments integral therewith and a plurality of circumferentially spaced transversely extending segments integral therewith and shearable therefrom, said shearable segments being longitudinally spaced from and in alignment with said stop segments, said one member also having a transversely extending portion integral therewith and shearable therefrom which is longitudinally spaced from said shearable segments on the side thereof remote from said stop segments; said other member having coupling segments movable longitudinally through the spaces between said stop segments and shearable segments for disposition between said shearable segments and transversely extending shearable portion and in alignment with said shearable segments and stop segments; the force required to shear said shearable segments being substantially less than the ultimate strength of both of said members; the force required to shear said portion being substantially less than the ultimate strength of both of said members.

13. In a tubular string adapted to be disposed in a well bore: an outer tubular member; an inner tubular member telescoped within said outer member; one of said members having a plurality of circumferentially spaced transversely extending stop segments integral therewith and a plurality of circumferentially spaced transversely extending segments integral therewith and shearable therefrom, said shearable segments being longitudinally spaced from and in alignment with said stop segments, said one member also having a transversely extending portion integral therewith and shearable therefrom which is longitudinally spaced from said shearable segments on the side thereof remote from said stop segments; said other member having coupling segments movable longitudinally through the spaces between said stop segments and shearable segments for disposition between said shearable segments and transversely extending shearable portion and in alignment with said shearable segments and stop segments; the force required to shear said shearable segments being substantially less than the ultimate strength of both of said members; the force required to shear said portion being substantially less than the ultimate strength of both of said members; and means for preventing substantial relative rotation between said members to maintain said coupling segments longitudinally aligned with said shearable segments and stop segments.

14. In a tubular string adapted to be disposed in a well bore: an outer tubular member; an inner tubular member telescoped within said outer member; one of said members having a plurality of circumferentially spaced transversely extending stop segments integral therewith and a plurality of circumferentially spaced transversely extending segments integral therewith and shearable therefrom, said shearable segments being longitudinally spaced from and in alignment with said stop segments; said other member having coupling segments movable longitudinally through the spaces between said stop segments and shearable segments for disposition on the side of said shearable segments remote from said stop segments and in alignment with said shearable segments to engage said shearable segments; the force required to shear said shearable segments being substantially less than the ultimate strength of both of said members; and segmental members disposed in the circumferential spaces between said stop segments and shearable segments to prevent substantial relative rotation between said members to maintain said coupling segments longitudinally aligned with said shearable segments and stop segments.

15. In a tubular string adapted to be disposed in a well bore: an outer tubular member; an inner tubular member telescoped within said outer member; said outer member having a plurality of circumferentially spaced transversely extending segments integral therewith and shearable therefrom; said outer member having a plurality of circumferentially spaced transversely extending stop segments in alignment with said segments on one side thereof and longitudinally spaced therefrom; said inner member having a plurality of circumferentially spaced coupling segments movable longitudinally through the spaces between said stop segments and shearable segments for location in alignment and engagement with said shearable segments on the other side thereof; the longitudinal force between said coupling segments and shearable segments required to shear said shearable segments being substantially less than the ultimate strength of both of said members.

16. In a tubular string adapted to be disposed in a well bore: an outer tubular member; an inner tubular member telescoped within said outer member; said outer member having a plurality of circumferentially spaced transversely extending segments integral therewith and shearable therefrom; said outer member having a plurality of circumferentially spaced transversely extending stop segments in alignment with said segments on one side thereof and longitudinally spaced therefrom; said outer member having a shearable transversely extending portion on the other side of and longitudinally spaced from said shearable segments; said inner member having a plurality of circumferentially spaced coupling segments movable longitudinally through the spaces between said stop segments and said shearable segments for location between said shearable segments and transversely extending portion and in alignment with said shearable segments; the longitudinal force between said coupling segments and shearable segments required to shear said shearable segments being substantially less than the ultimate strength of both of said members; the longitudinal force between said coupling segments and shearable portion required to shear said portion being substantially less than the ultimate strength of both of said members.

17. In a tubular string adapted to be disposed in a well bore: an outer tubular member; an inner tubular member telescoped within said outer member; said outer member having a plurality of circumferentially spaced transversely extending segments integral therewith and shearable therefrom; said outer member having a plurality of circumferentially spaced transversely extending stop segments in alignment with said segments on one side thereof and longitudinally spaced therefrom; said outer member having a shearable transversely extending portion on the other side of and longitudinally spaced from said shearable segments; said inner member having a plurality of circumferentially spaced coupling segments movable longitudinally through the spaces between said stop segments and said shearable segments for location between said shearable segments and transversely extending portion and in alignment with said shearable segments; the longitudinal force between said coupling segments and shearable segments required to shear said shearable segments being substantially less than the ultimate strength of both of said members; the longitudinal force between said coupling segments and shearable portion required to shear said portion being substantially less than the ultimate strength of both of said members; and means for preventing substantial relative rotation between said members to maintain said coupling segments longitudinally aligned with said shearable segments and stop segments.

18. In a tubular string adapted to be disposed in a well bore: an outer tubular member; an inner tubular member telescoped within said outer member; said outer member having a plurality of circumferentially spaced transversely extending segments integral therewith and shearable therefrom; said outer member having a plurality of circumferentially spaced transversely extending stop segments in alignment with said segments on one side thereof and longitudinally spaced therefrom; said outer member having a shearable transversely extending portion on the other side of and longitudinally spaced from said shearable segments; said inner member having a plurality of circumferentially spaced coupling segments movable longitudinally through the spaces between said stop segments and said shearable segments for location between said shearable segments and transversely extending portion and in alignment with said shearable segments; the longitudinal force between said coupling segments and shearable segments required to shear said shearable segments being substantially less than the ultimate strength of both of said members; the longitudinal force between said coupling segments and shearable portion required to shear said portion being substantially less than the ultimate strength of both of said members; and segmental members disposed in the circumferential spaces between said stop segments, shearable segments, and coupling segments to prevent substantial relative rotation between said members to maintain said coupling segments longitudinally aligned with said shearable segments and stop segments.

19. In a tubular string adapted to be disposed in a well bore: an outer tubular member; an inner tubular member telescoped within said outer member; said outer member having a plurality of circumferentially spaced transversely extending segments integral therewith and shearable therefrom; said outer member having a plurality of circumferentially spaced transversely extending stop segments in alignment with said segments on one side thereof and longitudinally spaced therefrom; said outer member having a shearable transversely extending portion on the other side of and longitudinally spaced from said shearable segments; said inner member having a plurality of circumferentially spaced coupling segments movable longitudinally through the spaces between said stop segments and said shearable segments for location between said shearable segments and transversely extending portion and in alignment with said shearable segments; the longitudinal force between said coupling segments and shearable segments required to shear said shearable segments being substantially less than the ultimate strength of both said members; the longitudinal force between said coupling segments and shearable portion required to shear said portion being substantially less than the ultimate strength of both of said members; stop means engaging said inner member for limiting the extent of telescopic movement between said members upon shearing of said portion; and means on said outer member engaging the sides of said coupling segments when said stop means engages said inner member to prevent substantial rotation between said members.

20. In a tubular string adapted to be disposed in a well bore: an outer tubular member; an inner tubular member telescoped within said outer member; said outer member having a plurality of circumferentially spaced transversely extending segments integral therewith and shearable therefrom; said outer member having a plurality of circumferentially spaced transversely extending stop segments in alignment with said segments on one side thereof and longitudinally spaced therefrom; said outer member having a shearable circumferentially continuous ring on the other side of and longitudinally spaced from said shearable segments; said inner member having a plurality of circumferentially spaced coupling segments movable longitudinally through the spaces between said stop segments and shearable segments for location between said shearable segments and ring and in alignment with said shearable segments; the longitudinal force between said coupling segments and shearable segments required to shear said shearable segments being substantially less than the ultimate strength of both of said members; the longitudinal force between said coupling segments and ring required to shear portions of said ring in alignment with said coupling segments being substantially less than the ultimate strength of both of said members; segmental members disposed in the circumferential spaces between said stop segments, shearable segments, and coupling segments to prevent substantial relative rotation between said inner and outer members to maintain said coupling segments longitudinally aligned with said shearable segments and stop segments; stop means engaging said inner member for limiting the extent of telescopic movement between said inner and outer members upon shearing of said ring; the portions of said ring remaining integral with said outer member engaging the sides of said coupling segments when said stop means engages said inner member to prevent substantial rotation between said inner and outer members.

21. In a tubular string adapted to be disposed in a well bore; an outer tubular member, an inner tubular member telescoped within said outer member; means for preventing substantial longitudinal movement in both directions between said members, including a transversely extending portion integral with one of said members and being of extended length circumferentially around said one member, said portion being shearable from said one member; means on said other member engaging said portion to transmit longitudinal loads therebetween; the force required to shear said portion from said one member being a predetermined value substantially less than the ultimate strength of both of said members; and means independent of said transversely extending portion for transmitting torque between said inner and outer members while said transversely extending portion is integral with said one member.

References Cited in the file of this patent

UNITED STATES PATENTS

| | | |
|---|---|---|
| 619,821 | Bray | Feb. 21, 1899 |
| 1,846,539 | Baurmann | Feb. 23, 1932 |
| 1,982,915 | Jenks | Dec. 4, 1934 |
| 2,293,938 | Dunn et al. | Aug. 25, 1942 |
| 2,712,854 | Creighton | July 12, 1955 |